United States Patent [19]
Koonen

[11] Patent Number: 5,978,117
[45] Date of Patent: Nov. 2, 1999

[54] DYNAMIC RECONFIGURATION OF A WIRELESS NETWORK USING FLEXIBLE WAVELENGHT MULTIPLEXING

[75] Inventor: Antonius Marcellus Jozef Koonen, Eemnes, Netherlands

[73] Assignee: Lucent Technologies Inc., Murray Hill, N.J.

[21] Appl. No.: 08/920,716

[22] Filed: Aug. 29, 1997

[51] Int. Cl.[6] .................................................. H04J 14/02
[52] U.S. Cl. .......................... 359/125; 359/167; 455/422; 370/310; 340/825-72
[58] Field of Search .................................. 359/124–128, 359/164, 167, 145, 172; 370/310, 277; 455/152-2, 561, 422

[56] References Cited

U.S. PATENT DOCUMENTS

| 5,301,353 | 4/1994 | Borras et al. | 359/145 |
| 5,619,361 | 4/1997 | Sagesaka et al. | 359/172 |

FOREIGN PATENT DOCUMENTS

| 0 368 673 A1 | 11/1989 | European Pat. Off. | H04Q 7/04 |
| 0 538 635 A2 | 9/1992 | European Pat. Off. | H04B 7/26 |

OTHER PUBLICATIONS

"High–Speed data transmission Using Millimeter–Wave Fiber–Optic Links," by H. Kawamura, et al., IEICE Transactions on Communications, vol. E79–B, No. Nov. 11, 1996, pp. 1784–1791.
European Search Report.

*Primary Examiner*—Kinfe-Michael Negash
*Attorney, Agent, or Firm*—Christopher N. Malvone

[57] ABSTRACT

A wireless communication system which is reconfigurable to accommodate varying traffic density is provided by using a flexible optical interface between a base station controller and several base stations. Communication between the base station controller and the base stations is provided over an optical fiber. The fiber carries several communication channels in both directions using wavelength multiplexing. The bandwidth between the base station controller and a particular base station is varied by increasing or decreasing the number of wavelengths used to communicate with the base station. Varying the bandwidth provides the ability to adjust the capacity to carry voice and/or data between the base station controller and the base station. As a result the number of radio frequency carrier frequencies assigned to a base station can be varied to support varying radio frequency traffic density throughout the wireless network.

30 Claims, 4 Drawing Sheets

DYNAMIC RECONFIGURATION OF A WIRELESS NETWORK USING FLEXIBLE WAVELENGHT MULTIPLEXING

BACKGROUND OF THE INVENTION

1. Field of the Invention

The present invention relates to a wireless communication network; more specifically, a wireless network with a reconfigurable infrastructure.

2. Description of the Related Art

Traffic densities serviced by wireless systems are often not constant during the day: e.g., in a city environment users living in the residential areas need a certain amount of interactive services in the morning (reading their e-mail, select breakfast news highlights, etc.), use more interactively during working hours at their business location (industrial region, or commercial sites in the city center), and want interactivity for their leisure time at home in the evening (internet games, etc.). So both the location and the nature of the interactive services needed changes during the day. Current wireless networks are not laid out to respond to these changes in traffic density. At certain moments, "hot spots" may occur in the network, i.e. traffic demands which locally exceed the fixed wireless capacity available, leading to rejection of calls and thus of revenues.

Current wireless systems are divided into regional areas called cells. Each cell uses one or more dedicated microwave carrier frequencies, with each frequency carrying a limited number of (voice or data) connections. The microwave carrier frequencies available in a wireless network are usually assigned among the cells in such a way that adjacent cells use different frequencies, in order to avoid interference problems. A common network structure consists of hexagonal cells 10 with the transmit/receive antenna in the middle, arranged in a cluster 12 containing seven cells. FIG. 1 shows the layout of such a cluster. By repeating this structure, a large geographical area can be covered. This fixed configuration is not sufficiently responsive to changing traffic densities.

SUMMARY OF THE INVENTION

A wireless communication system which is reconfigurable to accommodate varying traffic density is provided by using a flexible optical interface between a base station controller and several base stations. Communication between the base station controller and the base stations is provided over an optical fiber. The fiber carries several communication channels in both directions using wavelength multiplexing. The bandwidth between the base station controller and a particular base station is varied by increasing or decreasing the number of wavelengths used to communicate with the base station. Varying the bandwidth provides the ability to adjust the capacity to carry voice and/or data between the base station controller and the base station. As a result the number of radio frequency carrier frequencies assigned to a base station can be varied to support varying radio frequency traffic density throughout the wireless network.

Additionally, wavelength channels provide mutually independent communication channels, and as such may transport completely different signals. Thus in the same infrastructure it is possible to transport signals of widely differing formats, like GSM, ATM and DECT (Global System for Mobile Communications; Asynchronous Transfer Mode; Digital European Cordless Telecommunication System). Also different operators having licenses for different parts of the air spectrum may each have their dedicated wavelength channels in this infrastructure. So by creating multiple wavelength channels and their flexible assignment to the base stations, the network infrastructure is very versatile for hosting a number of different wireless systems and operators, and for adapting the network structure quickly as traffic or network maintenance requires, thus yielding an optimum operational efficiency.

BRIEF DESCRIPTION OF THE DRAWINGS

FIG. 1 illustrates a basic cell cluster;

FIG. 2 illustrates adding capacity in other microcells;

FIG. 3 illustrates splitting the cells into microcells;

FIG. 4 illustrates reconfiguring the network for a hot spot;

FIG. 5 illustrates partitioning the network into microcells;

FIG. 6 illustrates moving capacity from a cold spot;

DETAILED DESCRIPTION OF THE INVENTION

Figure 3:
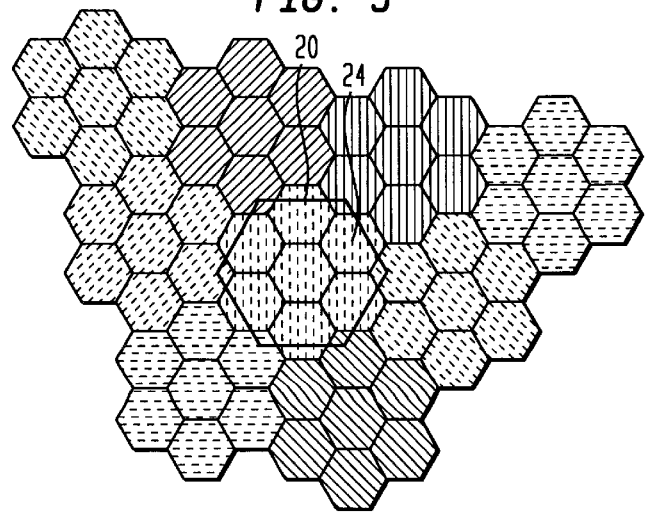

Where traffic density is dense, cells are partitioned into smaller microcells, each having their own antenna and the flexibility to assign one or more microwave carrier frequencies per microcell as needed. Partitioning each of the former cells 20 in seven (again hexagonal) microcells 24 yields the network layout shown in FIG. 3. No additional functionality is achieved yet.

Figure 1:
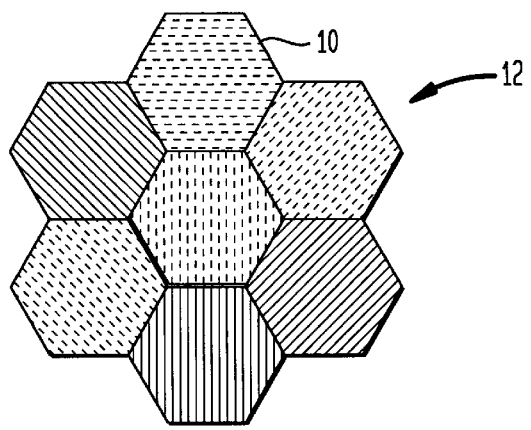
In FIGS. 1–6 different shading corresponds to different radio frequency carrier frequencies.
Figure 2:
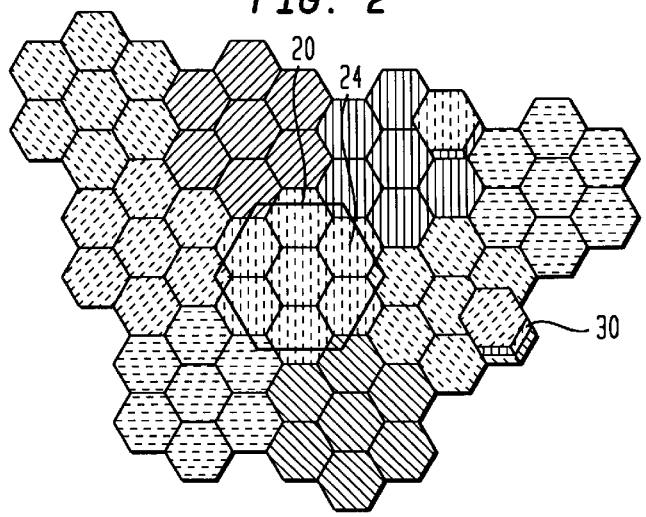
Figure 5:
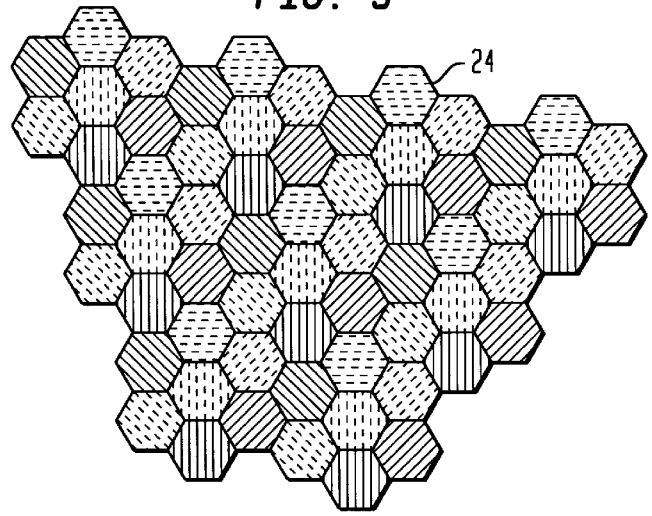

The benefits of this structure surface when extra capacity is needed suddenly at certain locations in the network. At "hot spots" (i.e., where traffic density is high) 30 one or more additional carrier frequencies may be applied, as sketched in FIG. 2. The whole network may be partitioned in microcells 24 when the traffic is intense all over the region, as shown in FIG. 5.

Figure 4:
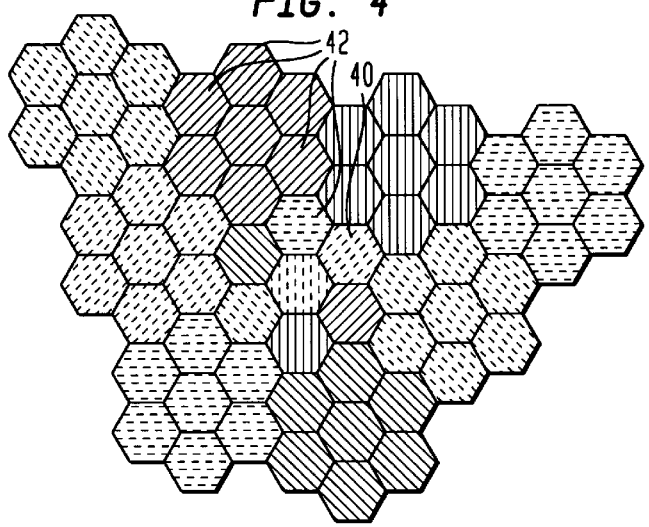
Figure 6:
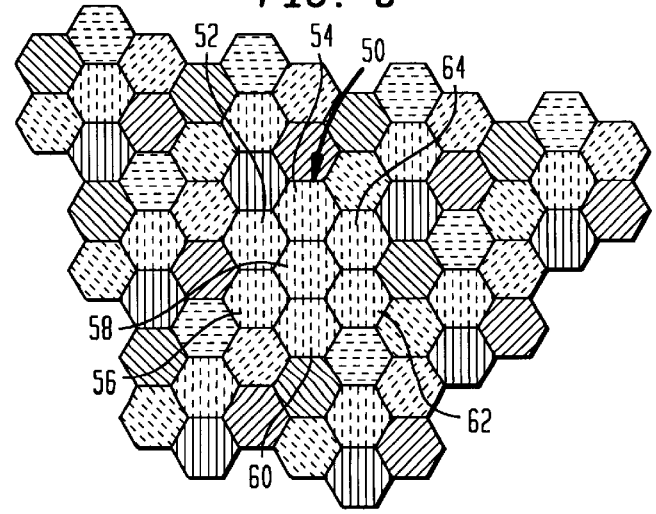

In reference to FIG. 4 and in the case of a "hot spot" in the network, the microcells may be arranged such that the full capacity of one (or more) carrier frequency is offered to that hot spot microcell 40, leaving the surrounding cells 42 at a less intense coverage as appropriate. In the opposite situation and in reference to FIG. 6, it is appropriate to restructure the cells such that capacity is shifted from a "cold spot" (i.e., where traffic density is slow) 50 comprising microcells 52–64 to surrounding cells. In this example microcells 52–64 share the same carrier frequency.

Figure 7:
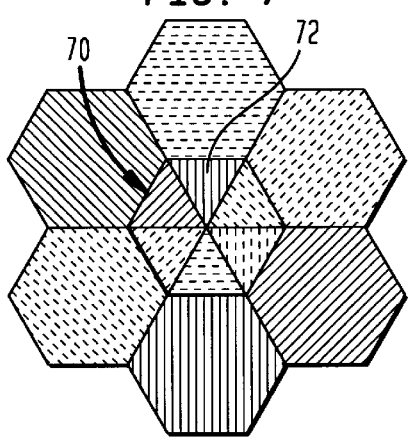
FIG. 7 illustrates segmenting a cell or microcell with a multi-segment antenna.
Figure 8:
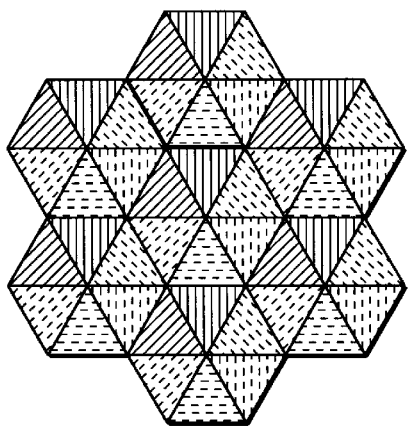
FIG. 8 illustrates segmenting all of the cells in a network.

This partitioning of the original network cells into microcells may also be implemented by segmenting the cells or microcells 70 into a multitude of parts or sectors 72 by a multi-sector antenna (instead of an omni-directionally radiating one, as used in the former situation), as sketched in FIG. 7. The advantage of this is that no new antenna pole locations have to be acquired; the omni-directional antenna on the pole just has to be replaced by a multi-sector one. Similarly as described before, the cells or microcells in the whole network may be segmented as needed, where the full segmentation is shown in FIG. 8. Also in a particular segment, multiple carrier frequencies may be stacked, in analogy to FIG. 2. Multi-sector antennas to apply the segmentation need to be activated only on those locations where "hot spots" are to be expected, in analogy to FIG. 4 and FIG. 6.

Figure 9:
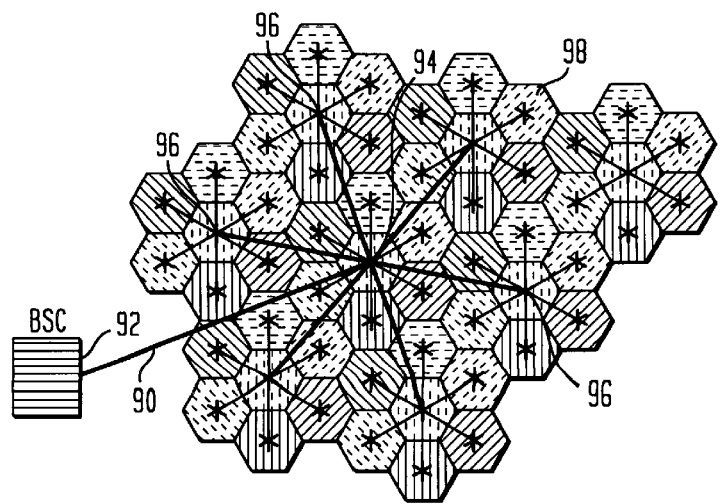
FIG. 9 illustrates wiring cells or microcells with optical fiber.
Figure 10:
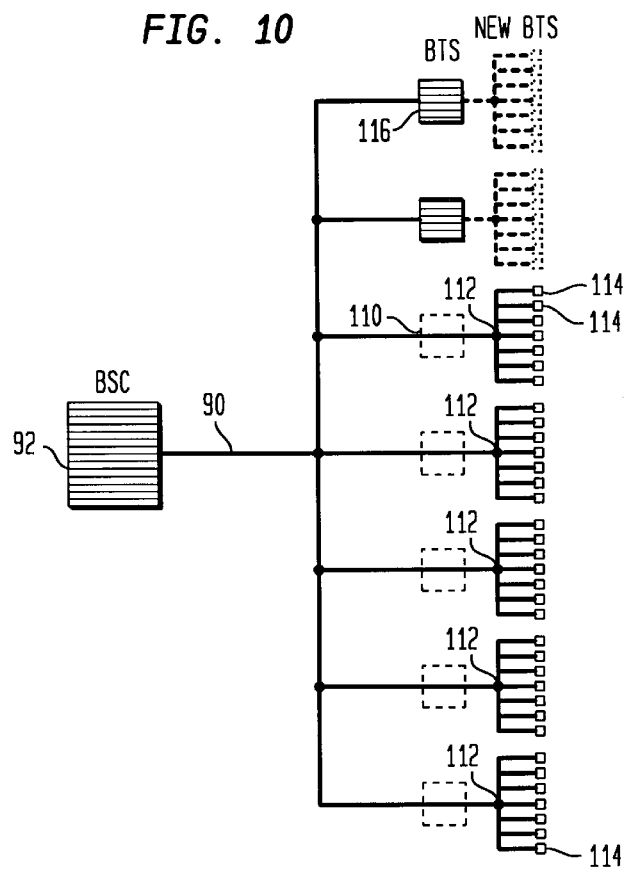
FIG. 10 illustrates upgrading from macro to microcells.

The wiring of the micro-cells structure (i.e. the structure with the microcells having omni-directional antennas, or the structure with the multi-sector antennas which segment a cell into microcells) can be done by a passively split optical network (PON). In a PON, the optical signals in the feeder fiber coming from the headend station are split among many drop fibers entering the so-called optical network units (ONUs) close to (or at) the base stations. By means of optical amplifiers, this splitting ratio may be increased up to a very high number. The PON technology is applied to a wireless application as shown in FIG. 9. The main fiber 90 coming from the Base Station Controller (BSC) 92 runs into the heart of the cluster 94 of 7*7 microcells, from where it is split to the hearts of the 7 clusters 96 of each 7 microcells 98, where it is again split among the individual antennas in the microcells. Schematically, a similar topology is represented by FIG. 10. The original unsplit cells were served by Base Transceiver Stations (BTSs) 110; by replacing those by an additional optical splitter 112 and a number of new BTSs 114, the extra microcells are created locally where needed. At the same time, the network continues to support the still remaining old BTSs 116; thus a graceful evolution from the macro-cell structure towards a microcell structure is possible.

Figure 11:
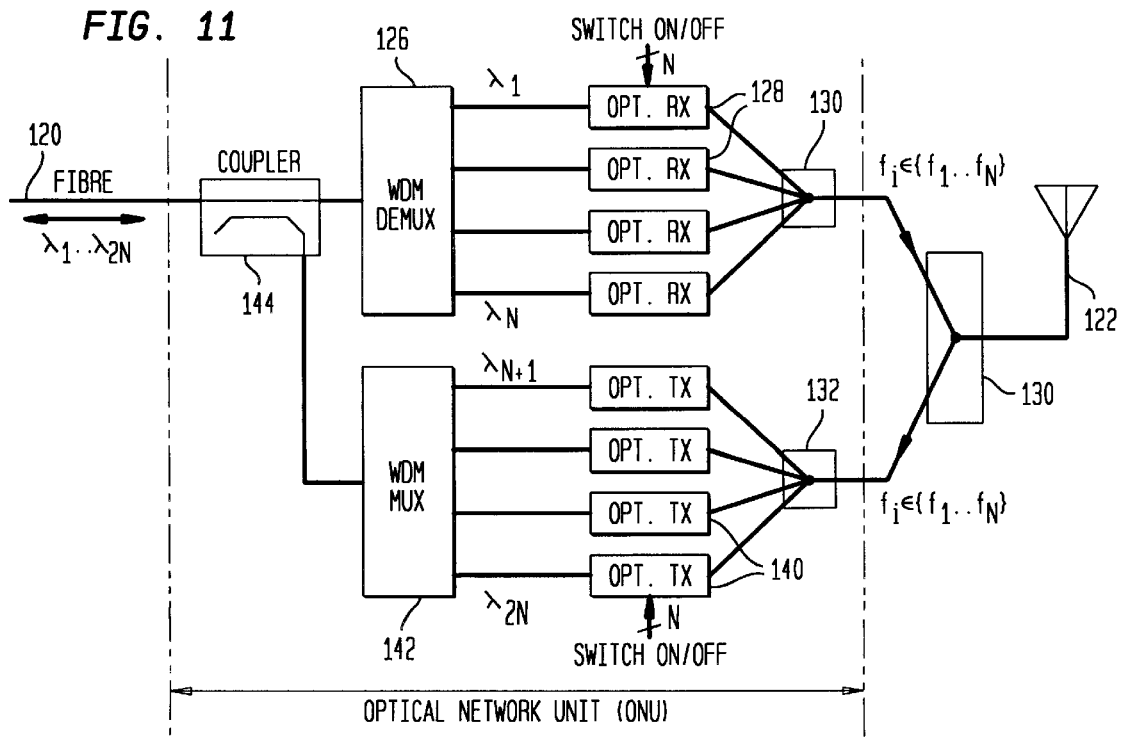
FIG. 11 illustrates an optical network unit.

In reference to FIG. 11, multiple wavelengths in the fiber network are used to feed the BTSs. In each BTS, the optical network unit terminating the fiber 120 and transferring the signals to and from the antenna 122 is able to select one or more of the wavelength channels for transmission or reception of its antenna. The wavelengths $\lambda_1 \ldots \lambda_N$ entering the ONU are first separated by a passive wavelength demultiplexer 126 (WDM demux), and each of them is fed to a separate receiver 128. Each wavelength carries the data for a microwave carrier to be used in the microcell. The outputs of these receivers are combined in directional coupler 130 and fed to the base station antenna 122, from where the data are sent to the users in the cell via the respective microwaves at carrier frequencies $f_1 \ldots f_N$. The receivers can each be switched on or off, and thus the actual wavelength channel selection is realized. This on/off switching is done under remote control from e.g. the BSC using an optical, wired or wireless communication channel. One or more wavelength channels may be switched on, thus yielding the possibility to have a number of selected carrier frequencies active in the microcell. This creates the flexible microcell configuration.

In a similar way, in the upstream direction a number of wavelength channels $\lambda_{N+1} \ldots \lambda_{2N}$ can be selected for bringing the data from the BTS towards the BSC. Hereto an array of optical transmitters 140, each equipped with a laser diode emitting a specific wavelength signal receive the upstream signals from directional coupler 130 and signal splitter 132. The upstream wavelengths are preferably different from the downstream ones, in order to minimize problems with optical reflections in the fiber network. Again the individual transmitters can be switched on or off under remote control, yielding the upstream flexible microcell configuration governed by the operator in such a way that the network usage is as efficient as possible. The upstream signals are combined using multiplexer 142 and coupled to fiber 120 by coupler 144.

The wavelengths being selected for reception at the ONU can be set independently from the wavelengths for trans- mission. This means that the microcell network structure for the downstream (i.e. from BSC towards BTSs) direction can be set differently from the structure for the upstream direction. This offers operational advantages in case of highly asymmetric traffic offerings.

Additionally, the intelligence presently located in the base stations can be moved upwards to the BSC, thanks to the possibility to increase the bandwidth between the BSC and BTS by assigning a wavelength channel (temporarily) to an individual base station. This entails significant cost savings in the base stations, reduction of maintenance, and increases the ease of network operation.

The invention claimed is:

1. A wireless communication system, comprising:
   a base station controller;
   at least one base station having an optical interface; and
   an optical fiber interconnecting the base station controller and the optical interface, the optical fiber carrying a plurality of communication channels where each communication channel is associated with an optical signal having one of a plurality of wavelengths, the optical interface providing a communication path between the base station and the base station controller using at least one of the plurality of communication channels.

2. The wireless communication system of claim 1, wherein the optical interface is programmable to select at least one of the plurality of communication channels.

3. The wireless communication system of claim 2, wherein the optical interface is remotely programmable.

4. The wireless communication system of claim 1, wherein the optical interface comprises an optical transmitter and an optical receiver.

5. The wireless communication system of claim 4, wherein the optical transmitter is programmable to select at least one of the plurality of communication channels as a transmit channel and the optical receiver is programmable to select at least one of the plurality of communication channels as a receive channel.

6. The wireless communication system of claim 5, wherein the optical transmitter and the optical receiver are remotely programmable.

7. The wireless communication system of claim 5, wherein the transmit channel and the receive channel are different channels.

8. The wireless communication system of claim 7, wherein the optical transmitter and the optical receiver are independently programmable.

9. The wireless communication system of claim 7, wherein the optical transmitter and the optical receiver are remotely programmable.

10. A wireless communication system, comprising:
    a base station controller;
    at least one base station having an optical interface; and
    an optical fiber interconnecting the base station controller and the optical interface, the optical fiber carrying a plurality of communication channels where each communication channel is associated with an optical signal having one of a plurality of wavelengths, the optical interface providing a communication path between the base station and the base station controller using a first set and a second set of communication channels where each set has at least one channel belonging to the plurality of communication channels, the first set being associated with a first service provider and the second set being associated with a second service provider.

11. The wireless communication system of claim 10, wherein the optical interface is programmable to select at least two of the plurality of communication channels.

12. The wireless communication system of claim 11, wherein the optical interface is remotely programmable.

13. The wireless communication system of claim 10, wherein the optical interface comprises an optical transmitter and an optical receiver.

14. The wireless communication system of claim 13, wherein the optical transmitter is programmable to select at least two of the plurality of communication channels as transmit channels and the optical receiver is programmable to select at least two of the plurality of communication channels as receive channels, where at least one transmit channel and at least one receive channel belong to the first set and where at least one transmit channel and at least one receive channel belong to the second set.

15. The wireless communication system of claim 14, wherein the optical transmitter and the optical receiver are remotely programmable.

16. The wireless communication system of claim 14, wherein the transmit channels are different than the receive channels.

17. The wireless communication system of claim 16, wherein the optical transmitter and the optical receiver are independently programmable.

18. The wireless communication system of claim 16, wherein the optical transmitter and the optical receiver are remotely programmable.

19. A wireless communication system, comprising:

a base station controller;

at least one base station having an optical interface; and an optical fiber interconnecting the base station controller and the optical interface, the optical fiber carrying a plurality of communication channels where each communication channel is associated with an optical signal having one of a plurality of wavelengths, the optical interface providing a communication path between the base station and the base station controller using a first set and a second set of communication channels where each set has at least one channel belonging to the plurality of communication channels, the first set being associated with a first communication format and the second set being associated with a second communication format.

20. The wireless communication system of claim 19, wherein the optical interface is programmable to select at least two of the plurality of communication channels.

21. The wireless communication system of claim 20, wherein the optical interface is remotely programmable.

22. The wireless communication system of claim 19, wherein the optical interface comprises an optical transmitter and an optical receiver.

23. The wireless communication system of claim 22, wherein the optical transmitter is programmable to select at least two of the plurality of communication channels as transmit channels and the optical receiver is programmable to select at least two of the plurality of communication channels as receive channels, where at least one transmit channel and at least one receive channel belong to the first set and where at least one transmit channel and at least one receive channel belong to the second set.

24. The wireless communication system of claim 23, wherein the optical transmitter and the optical receiver are remotely programmable.

25. The wireless communication system of claim 23, wherein the transmit channels are different than the receive channels.

26. The wireless communication system of claim 25, wherein the optical transmitter and the optical receiver are independently programmable.

27. The wireless communication system of claim 25, wherein the optical transmitter and the optical receiver are remotely programmable.

28. A wireless communication system, comprising:

a base station controller;

at least one base station having an optical interface, the optical interface having an optical receiver and an optical transmitter; and an optical fiber interconnecting the base station controller and the optical interface, the optical fiber carrying a plurality of communication channels where each communication channel is associated with an optical signal having one of a plurality of wavelengths, the optical interface providing a communication path between the base station and the base station controller using at least one of the plurality of communication channels, the optical receiver having a wavelength demultiplexer and an array of switchable optical receivers, the wavelength demultiplexer receiving a plurality of received optical signals and providing each switchable optical receiver with an optical signal belonging to the plurality of received optical signals, the optical transmitter having an array of switchable optical transmitters and a wavelength multiplexer, each of the switchable optical transmitters providing a transmitted optical signal to the wavelength multiplexer and the wavelength multiplexer combining the transmitted optical signals to provide a plurality of transmitted optical signals.

29. The wireless communication system of claim 28, wherein at least one of the switchable optical receivers belonging to the array of switchable optical receivers is remotely controllable to enable reception of a communication channel belonging to the plurality of communication channels.

30. The wireless communication system of claim 28, wherein at least one of the switchable optical transmitters belonging to the array of switchable optical transmitters is remotely controllable to enable transmission on a communication channel belonging to the plurality of communication channels.

* * * * *